United States Patent
Maldari et al.

(10) Patent No.: US 9,924,297 B2
(45) Date of Patent: Mar. 20, 2018

(54) TIMED AND VARIABLE DURATION FOR MULTIPLE DEVICE SYNCHING

(71) Applicant: International Business Machines, Armonk, NY (US)

(72) Inventors: Mario Alessandro Maldari, Longmont, CO (US); Corville Orain Allen, Morrisville, NC (US); Paul Anthony Smith, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 191 days.

(21) Appl. No.: 14/262,920

(22) Filed: Apr. 28, 2014

(65) Prior Publication Data

US 2015/0312703 A1    Oct. 29, 2015

(51) Int. Cl.
*H04W 4/00* (2018.01)
*H04W 76/02* (2009.01)

(52) U.S. Cl.
CPC ......... *H04W 4/008* (2013.01); *H04W 76/021* (2013.01)

(58) Field of Classification Search
CPC .................................................. H04W 4/008
See application file for complete search history.

(56) References Cited

U.S. PATENT DOCUMENTS

| | | | |
|---|---|---|---|
| 8,086,287 B2 | 12/2011 | Mooney et al. | |
| 8,620,216 B2 | 12/2013 | Castrogiovanni et al. | |
| 2002/0098878 A1* | 7/2002 | Mooney | G08B 1/08 455/569.1 |
| 2006/0252412 A1* | 11/2006 | Yamato | H04W 92/02 455/412.1 |
| 2007/0238475 A1* | 10/2007 | Goedken | H04M 1/7253 455/512 |
| 2010/0162324 A1 | 6/2010 | Mehta et al. | |

* cited by examiner

*Primary Examiner* — Hsin-Chun Liao
(74) *Attorney, Agent, or Firm* — VanLeeuwen & VanLeeuwen; Richard A. Wilhelm

(57) ABSTRACT

A Bluetooth system is comprised of a Bluetooth device and multiple network devices connectable to the Bluetooth device. This Bluetooth device can selectively switch connection pairings with devices in the network based on some triggering event. The switching function automatically occurs between the Bluetooth and network devices without any user intervention. This pairing enables seamless collaboration between devices owned by an owner based on the power settings and usage of the system without needing the user's interaction.

11 Claims, 9 Drawing Sheets

| 502 | 504 | 506 | 508 |
|---|---|---|---|
| Priority | Device Type | Device ID. | Connection Protocol |
| 1 | Smart Phone | A | A1S1C |
| 2 | Smart Phone | B | B1S1C |
| 3 | Computer Tablet | C | C1S1C |
| 4 | Personal Computer | D | D1S1C |

TIMED AND VARIABLE DURATION FOR MULTIPLE DEVICE SYNCHING

FIELD OF THE INVENTION

This invention relates to a method and system for switching a Bluetooth connection between electronic devices and in particular, this invention relates to a method and system for automatically switching a Bluetooth connection from a first connected to a second without the need for the user to perform connection protocols to the second device.

BACKGROUND OF THE INVENTION

Wireless communication has become the most used form of communication and system configuration. Wireless connections provide enormous flexibility to users. The most desirable feature of wireless communication is a person's ability to freely move around without restrictions resulting to physically connected devices. Another attractive feature of wireless connections is the ability to configure and arrange objects and components of a system without having to account for wired connections.

The most widely used form of wireless connection of a device is the telephone. Beginning with the cordless telephone and expanding to the cellular telephone and the smart phones, wireless communication is a way of life in our society. FIG. 1 is an external diagram of a conventional mobile cellular telephone device. The cellular telephone 100 includes antenna 110 for receiving and transmitting wireless signals to and from the cellular telephone network. Cellular telephone 100 also includes speaker 120 for playing audible signals received by cellular telephone 100 through the cellular telephone network. Display screen 130 is used to display caller identification information pertaining to incoming calls as well as telephone directory information and other cellular telephone configuration information. Cellular telephone 100 includes a variety of keys that the user presses to perform various functions or to enter phone numbers or alphanumeric data. Talk button 140 is used to answer a call or to initiate a call when the cellular telephone user places a call. Hold button 150 is used to hold an incoming call so that the cellular telephone user can take additional time to finish a task or leave a room in order to answer the call. End button 160 is used to hang up the cellular telephone. Keys 170 are used to enter numbers, star (*) functions, and pound sign (#) functions. Microphone 180 is used to capture words spoken by the cellular telephone user and transmit them to the other party.

Another aspect of wireless communication regarding the telephone devices is the ability to be "hands free'. An initial approach to implement a "hands free" telephone device was a telephone speaker or a set of earphones. However, a growing and popular alternative has been a wireless attachment that a user wears on his or her ear. The cellular telephone device communicates with the wireless attachment. The cellular telephone sends the received audio and transmits it to the wireless attachment through which the user hears. A primary technology that facilitates this communication is known as "Bluetooth technology". Bluetooth is a wireless technology standard for exchanging data over short distances from fixed and mobile devices.

FIG. 2 is a block diagram of an example wireless communication system 200 in which WLAN transmissions and Bluetooth transmissions may coexist. The system 200 includes a WLAN access point 202 which may be coupled with a plurality of wireless stations 204, 205 for WLAN communications between the access point and each of the wireless stations 204 and 206. Each of the wireless stations 204 and 206 and the access point 202 may communicate according to one or more of the Institute of Electrical and Electronics Engineering (IEEE) 802.11 Standards, for example, or any other desired WLAN protocol, as indicated by the WLAN communication signals 208 and, 210.

As shown in FIG. 2, the wireless station 206 is Bluetooth-enabled. In addition to receiving WLAN data packets from the access point 202 of the wireless local area network 200, the wireless station 206 also is capable of connecting to and communicating with a headset or any other suitable Bluetooth-enabled device 212 via a Bluetooth connection 214. In order to establish the Bluetooth connection 214, the wireless station 206 may utilize the Bluetooth inquiry and paging procedures.

Bluetooth devices operate in a mode known as "discovery mode". Bluetooth devices, when in discoverable mode, are able to be seen (discovered) by other Bluetooth devices. If two phones connect, the phone that is trying to establish the initial connection, must be looking for a phone that is "discoverable" otherwise it will not see it. Once the connection is saved, discoverable mode is no longer necessary, as the phones already know each other. This is only necessary during an initial link.

If one Bluetooth-enabled device is in discovery mode and discovers another Bluetooth-enabled device nearby, it can query for its services and choose to establish a Bluetooth link, or a 'pairing relationship', with the other Bluetooth-enabled device. Establishing a Bluetooth link with another Bluetooth-enabled device is also known as pairing. FIG. 3 is a visual representation of Bluetooth wireless communication between two Bluetooth-enabled devices during service discovery.

Many of the services offered over Bluetooth can expose private data or allow the connecting party to control the Bluetooth device. For security reasons it is necessary to be able to recognize specific devices and thus enable control over which devices are allowed to connect to a given Bluetooth device. At the same time, it is useful for Bluetooth devices to be able to establish a connection without user intervention (for example, as soon as they are in range).

To address this issue, Bluetooth uses a process called bonding, and a bond is generated through a process called pairing. The pairing process is triggered either by a specific request from a user to generate a bond (for example, the user explicitly requests to "Add a Bluetooth device"), or it is triggered automatically when connecting to a service where (for the first time) the identity of a device is required for security purposes. These two cases are referred to as dedicated bonding and general bonding respectively.

Pairing often involves some level of user interaction; this user interaction is the basis for confirming the identity of the devices. Once pairing successfully completes, a bond will have been formed between the two devices, enabling those two devices to connect to each other in the future without requiring the pairing process in order to confirm the identity of the devices. When desired, the bonding relationship can later be removed by the user.

Although the use of the Bluetooth technology has made wireless communications more convenient, some limitations still remain for users of the Bluetooth technology. For example, pairing a Bluetooth device (e.g. Iphone) to a Bluetooth enabled output device, (eg. speaker), one is limited to the Bluetooth connection of the current device. If you want to switch (because of low battery, or simply out of boredom of selection), you must manually disconnect the device and pair it with a new device. This causes delays and a reconfigure of a Bluetooth connection to a new device.

Currently there are ways to send information from one smart device to another, for example switch from watching a feature on your TV to your tablet and have it automatically play and sync there. These are primarily just switching procedures based on user request as to which device should receive the data. We want to improve the intelligence here and provide a seamless collaboration with devices.

SUMMARY OF THE INVENTION

The core idea of this invention is to selectively switch pairing with registered device based on the usage and power setting of the paired device with a co-coordinating blue tooth device. This pairing enables seamless collaboration between devices owned by an owner based on the power settings and usage of the system without needing the user's interaction.

The present invention describes a solution that would allow a user to set a time duration for multiple devices and automatically switch to those devices per a fixed time duration (e.g. every 3 hours). Having this capability will allow for many Bluetooth enabled devices to participate in the communication with the Bluetooth output device. An example would be having multiple playlists across multiple devices. A user can play through an entire catalogue or playlist of music and then have it automatically switched to next device and next play list.

Alternatively, there could be a setting for a variable/random connection where the connection happens at a random interval. This approach would greatly expand the playtime of audio, video and prevent "stale" content from coming across your Bluetooth output device.

Another facet of the present invention helps to enable high availability of the devices that are paired with the output device. For example, if the device becomes out of range, or is shut off, the Bluetooth output device (e.g. speaker) will automatically pair with the next device that it is paired with. Additionally, if the Bluetooth output device detects a problem with the paired device (low battery), it will automatically pair with the next device listed. This ensures a constant connection to the Bluetooth output device without an interruption or connection delay. Note: This is not limited to Bluetooth but any peer-to-peer wireless network where devices may need to alternatively switch based on these intelligent coordinating systems.

DETAILED DESCRIPTION OF THE INVENTION

Figure 4:
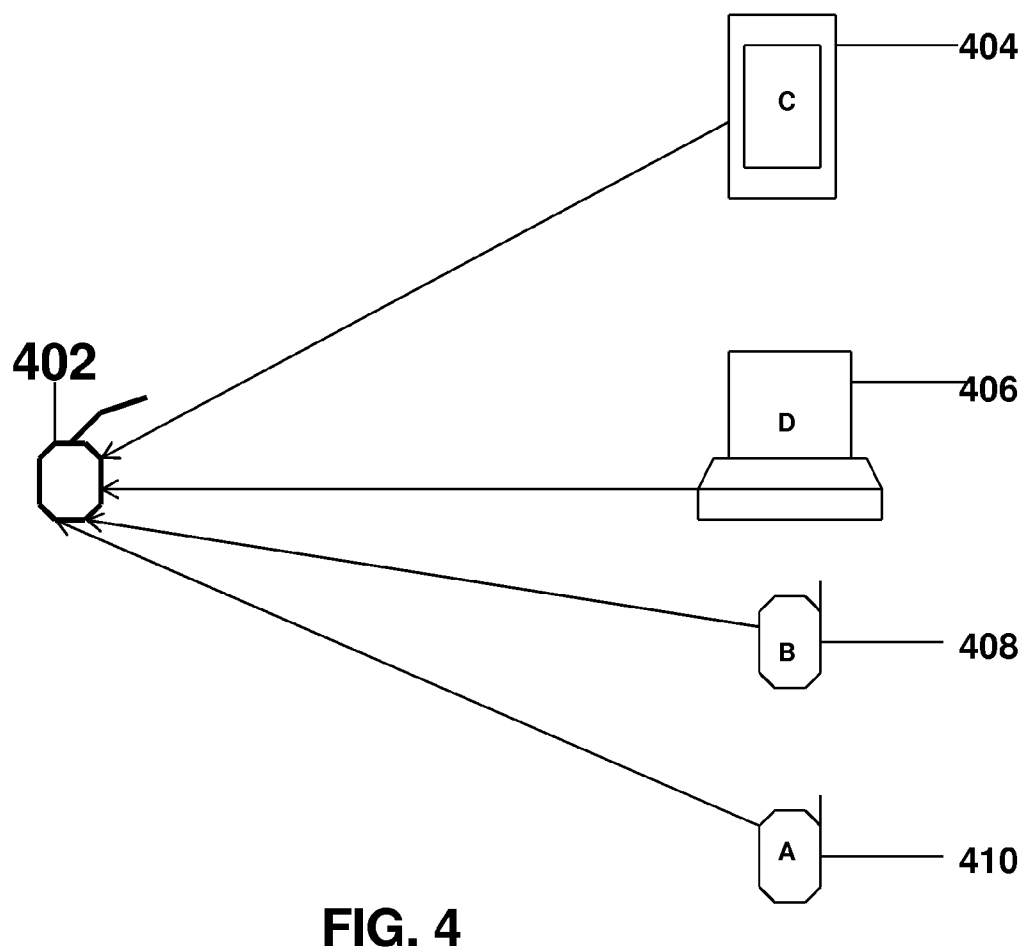
FIG. 4 is a configuration of a Bluetooth device connected to multiple devices.

FIG. 4 is a configuration of local network of Bluetooth devices. In this configuration, the Bluetooth device 402 can connect to and communicate with the four devices 404, 406, 408 and 410. These connectable devices include a first smart phone device A 408, a second smart phone device B 410, a computer tablet C 404 and a personal computer device D 406. In this configuration, the user through the Bluetooth device 402 connects with and receives data from that device at one time. In a conventional Bluetooth connection, if a Bluetooth user connected to device A wants to switch to another device such as device C, the user would need to manually connect the Bluetooth device 402 to the device C 404. In the present invention, the switch and connection of the Bluetooth device to the device C is automatically performed by the Bluetooth and connecting device based on information contained in a Bluetooth device index.

In the implementation of the invention, Bluetooth devices will be registered to a Bluetooth output device in order of preferred use. The Bluetooth output device will allow for timed synching between devices that is either fixed or variable. When the time duration is achieved, the pairing will move to the next available device. This switched pairing may also occur for various fail over events, such as out of range, low battery, and shutdown of the paired device. When one of these instances occurs, the pairing will move in a sequential order down the list of registered input devices. Basic implementation details of the invention are as follows:

1. The user will "register" Bluetooth enabled pairing devices (iphone, Ipad, Ipod, etc.) to the Bluetooth enabled output device (e.g. speaker).
2. The user will have the option to configure their Bluetooth output device (speaker) to have a fixed time duration in which it will switch the synch to another device.
3. The user will have the option to configure their Bluetooth output device (speaker) to have a variable time duration (random) in which it will switch the synch to another device.
4. If the device that the Bluetooth output device is trying to pair with is not currently available (shut off, or out of range, etc.), the output device will sequentially move to each device listed in the registry until it finds one to pair with and connect to.
5. If the synched device becomes low on battery and the "low battery" indicator appears, that will trigger the Bluetooth output device to switch to the next device in the registry.

Figure 5:
FIG. 5 is an index of the devices that connect to a Bluetooth device in a network.

As mentioned, in the present invention, the Bluetooth device automatically switches from one device to another device performed based on information contained in a Bluetooth device index. FIG. 5 an index of the devices that connect to a Bluetooth device in a network. This index comprises a table of four devices that are connectable to a Bluetooth device in a network. In this table, each device has a record containing four pieces of information: a device priority 502; a device type 504; a device identity 506 and a device connection protocol 508. The priority column 502 indicates the priority given to each device. The device type column 504 indicates the particular type of device. In addition, each device is assigned an identification marker in column 506. Column 508 stores the connection protocol code for each device. This connection protocol code enables the Bluetooth device to automatically connect to the particular device without the need for the user intervention. In the implementation, the Bluetooth device can read the connection protocol code for a device. The code contains the information needed for the Bluetooth device to establish a connection with the particular device.

Figure 1:
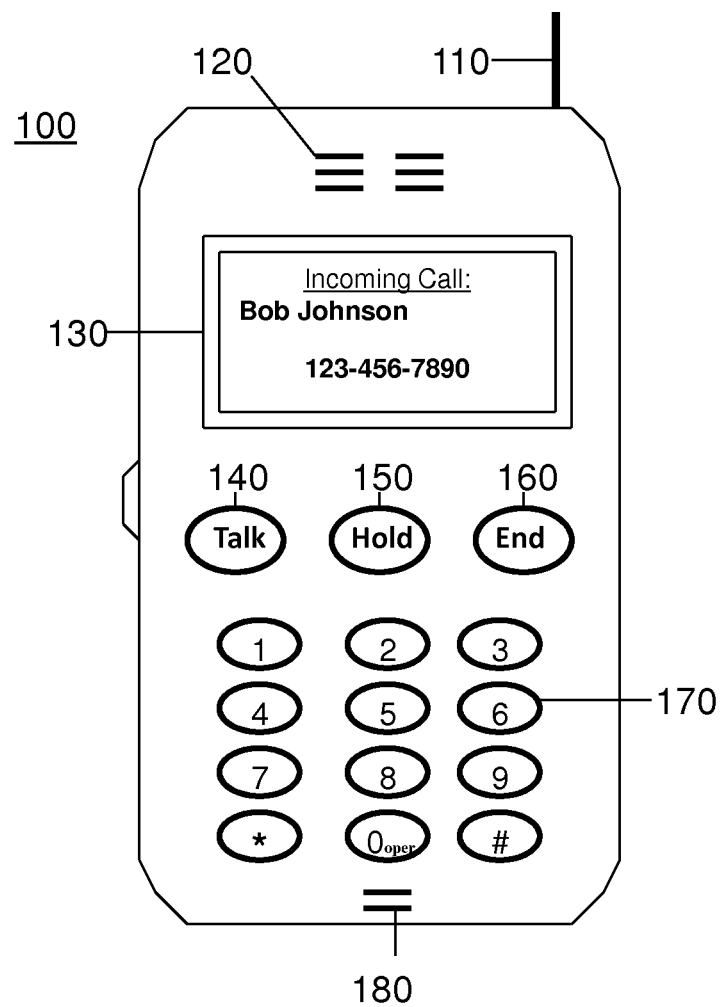
FIG. 1 is an external diagram of a conventional mobile cellular telephone device.
Figure 2:
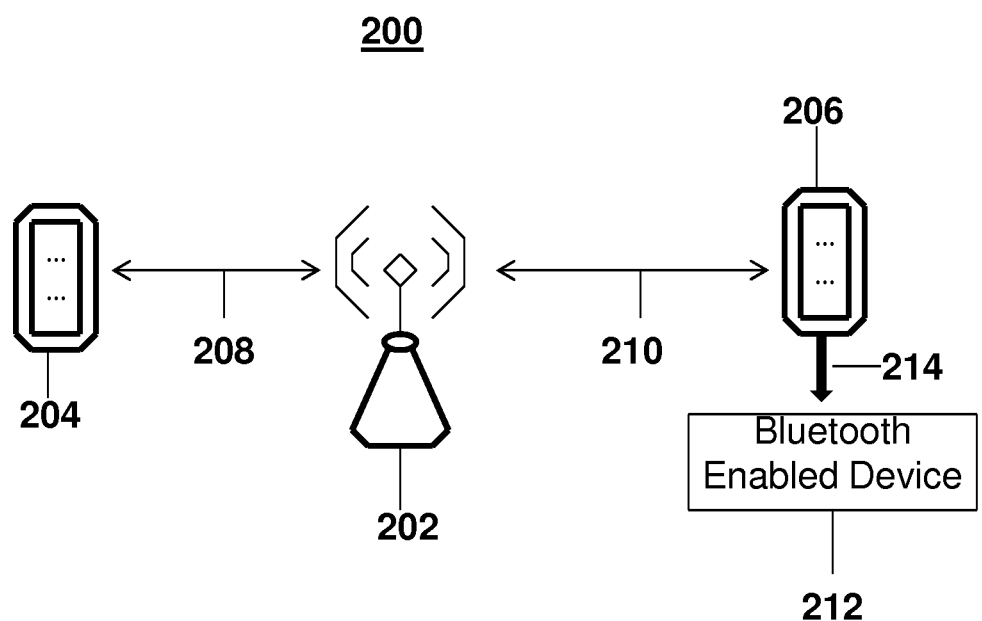
FIG. 2 is a block diagram of an example wireless communication system in which Wireless Local Area Network (WLAN) transmissions and Bluetooth transmissions may coexist.
Figure 3:
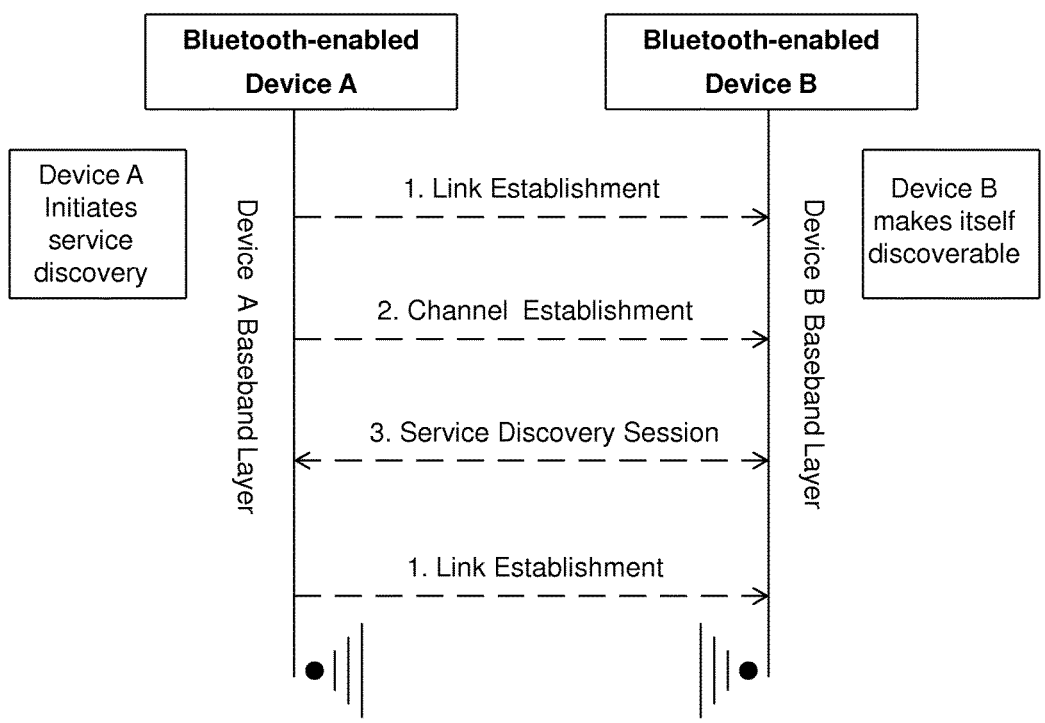
FIG. 3 is a visual representation of Bluetooth wireless communication between two Bluetooth-enabled devices during service discovery
Figure 6:
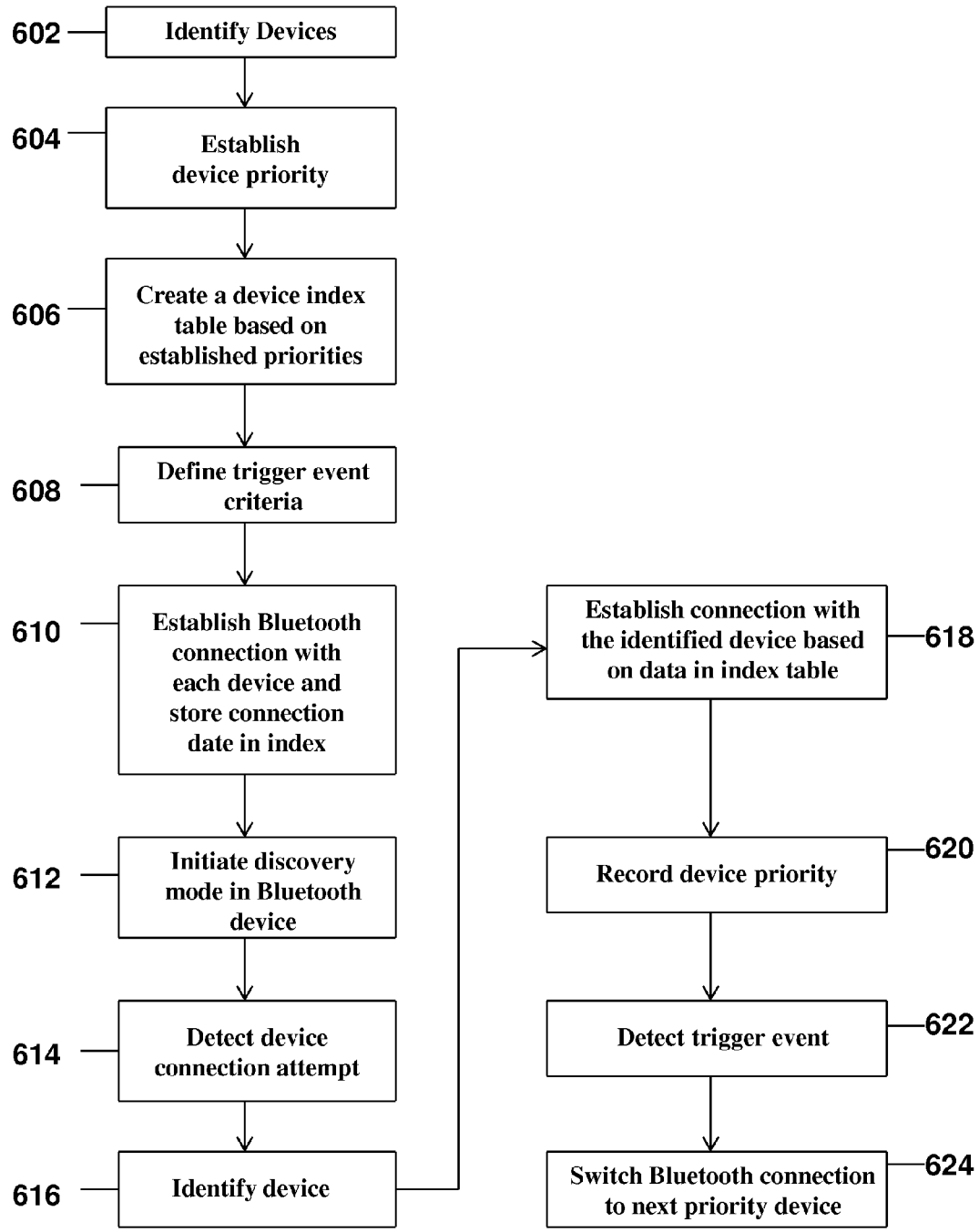
FIG. 6 is a flow diagram in the steps in multiple synching of devices with a Bluetooth device according to the method of the present invention.

In the implementation of the present invention, FIG. 6 is a flow diagram of the steps in multiple synching of devices with a Bluetooth device according to the method of the present invention. Referring to FIG. 2, in step 602, the user identifies the devices that will be part of the network that will have the capability to connect with the Bluetooth device. After identifying the devices in the network, in step 604, priorities are assigned to each device. The user can determine the priority order. The priority order defines the sequence in which connections to the devices will occur. The Bluetooth device will automatically switch connections from one device to the next device based on the device priority order. The information generated in steps 602 and 604 is used to create an index of network devices in step 606. Step 608 defines events that could trigger a switch in the Bluetooth connection from one device to the next device in the priority list. These trigger events can vary and are based on a user's preferences. Examples of trigger events could be a set time interval. After a time period has elapsed, a trigger is issued. Another example of a trigger would be the completion of a task. For example, the completion of a music track playing one a device could end causing a trigger to occur. The ending of a movie would also be a trigger. Once the list of devices for the network is defined, in step 610, the Bluetooth device 402 establishes a connection protocol for each device in the priority list. The connection protocol for each device is also stored in the index record for that device. When an event trigger occurs, the Bluetooth device can automatically connect to the next device in the priority list by reading and then following the stored connection protocol for that device. Steps 602 through 610 complete the set up portion of the method. At this point, in step 612, the Bluetooth device goes into discovery mode in order to the highest priority Bluetooth device that is active.

When a user activates a device in the network, this activity would trigger an event in step 614. For example, a user may decide to play some music from a smart phone device in the network through the Bluetooth. At the initiation of this activity, the Bluetooth device will detect this activity. In step 616, the Bluetooth device will identify the initiating device. Step 618 establishes a connection the Bluetooth device and the active network device. After the connection, step 620 records the priority of the connected network device. This priority notation will enable the Bluetooth device to know the next network device to which to connect when another trigger event is detected. While the Bluetooth device is connected to a network device, a trigger event can occur. Step 622 detects this trigger event. Step 624 then performs an automatic Bluetooth connection switch to the next device in the priority list. Step 624 can comprise the actions included in steps 612, 614, 616, 618 and 620.

Figure 7:
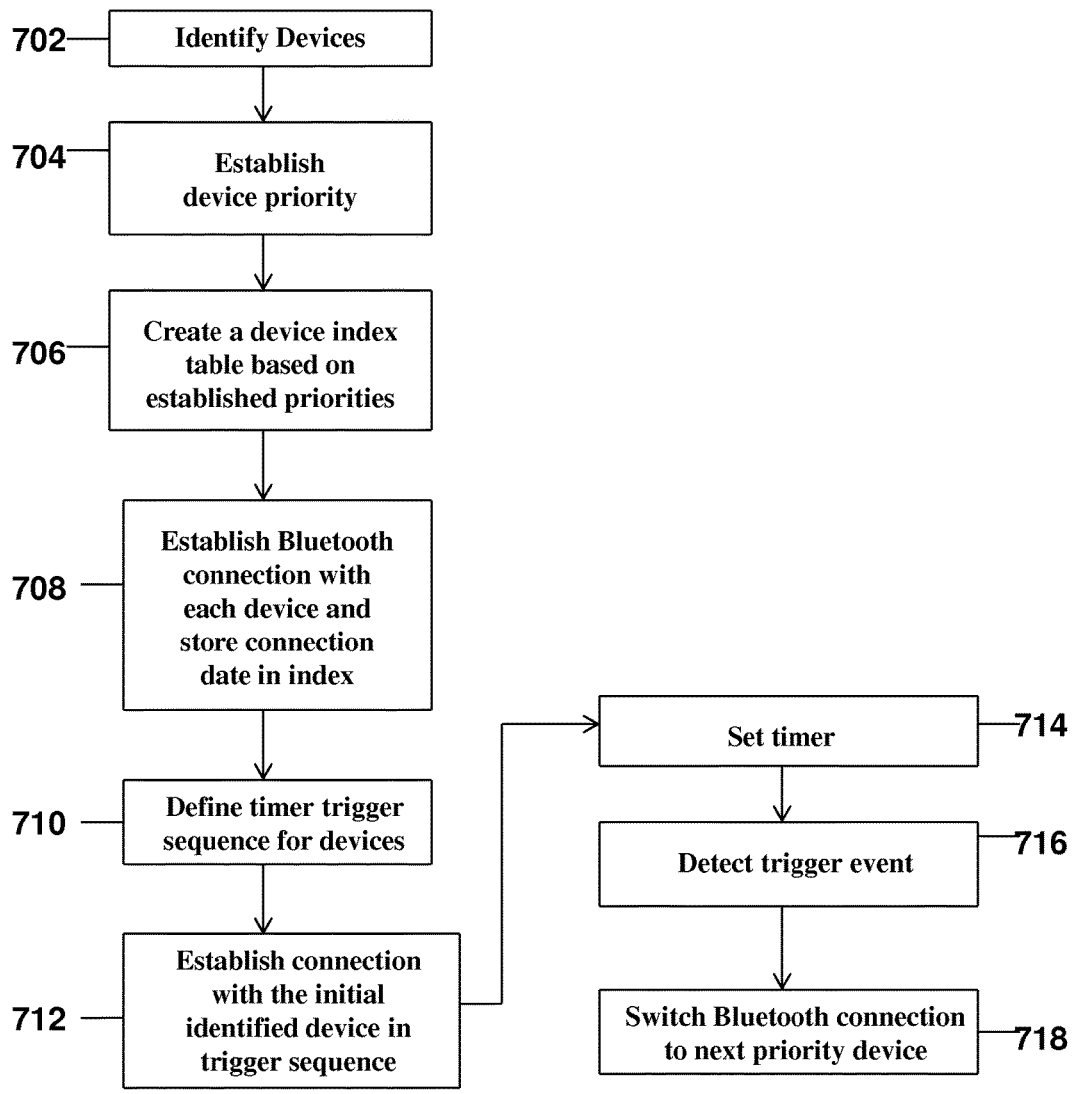
FIG. 7 is a flow diagram of the steps in a method of the present invention in which a Bluetooth connection is automatically switched from one device to another device in the same network based on a predetermined time.

As mentioned, one trigger could be a predefined time for an event to occur. FIG. 7 is a flow diagram of the steps in a method of the present invention in which a Bluetooth connection is automatically switched from one device to another device in the same network based on a predetermined time. In this alternate method of the invention, steps 702, 704, 706 and 708 are the same as steps 602, 604, 606 and 608 respectively in FIG. 6. In step 710, the timer trigger sequence for network devices is established. This sequence could be for one event or several events in a timed sequence. Step 712 establishes a connection the Bluetooth device and the initial network device in the defined timer sequence. Step 714 sets the timer. At the completion of the timed period, a timer event is triggered in step 716. At this point, step 718 then performs an automatic Bluetooth connection switch to the next device in the priority list according to the defined trigger sequence.

Figure 8:
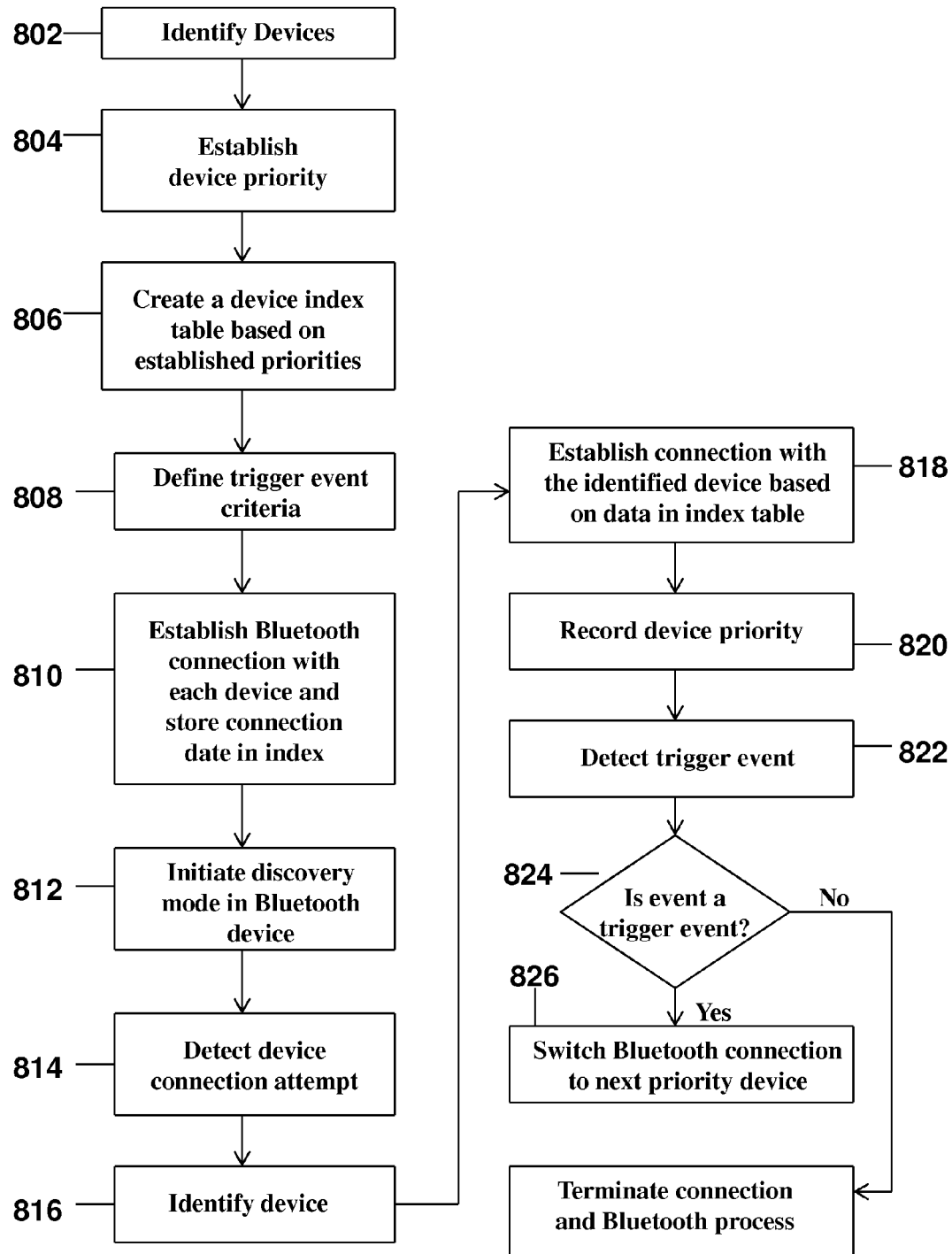
FIG. 8 is a flow diagram of the steps in a method of the present invention in which a Bluetooth connection is terminated when an unknown trigger event is detected.

During the implementation of the invention, an event may occur that is not one of the defined trigger events. An unknown and unplanned event may occur or the user may decide to interrupt the process for some reason. FIG. 8 is a flow diagram of the steps in a method of the present invention in which a Bluetooth connection is terminated when an unknown trigger event is detected. When an unknown trigger event is detected, because the event is unknown to the system, the system response is to shut down. This alternate method is similar to the base method described in FIG. 6. In this method, steps 802, 804, 806, 808, 810, 812, 814, 816, 818, 820 and 822 are the same steps as 602, 604, 606, 608, 610, 612, 614, 616, 618, 620 and 622 respectively. After an event is detected, step 824 determines if the event is one the defined trigger events. If the determination is that the detected event is a trigger event, the method moves to step 826 the same as in FIG. 6 and the Bluetooth devices switches its connection to the next network device in the priority list. If however, the detected event was not one of the previously defined trigger events, step 828 would terminate the Bluetooth process until reactivated by the user.

In the process of the present invention, the user may want to initiate a custom connection sequence for a particular application that is different from the predetermine priority sequence. This sequence change can be for just one activity and at the completion of the single activity; the system would revert back to the predefined priority sequence. If the user desires to maintain the custom connection sequence, at that point, the user would need to change the trigger event criteria and sequence.

Figure 9:
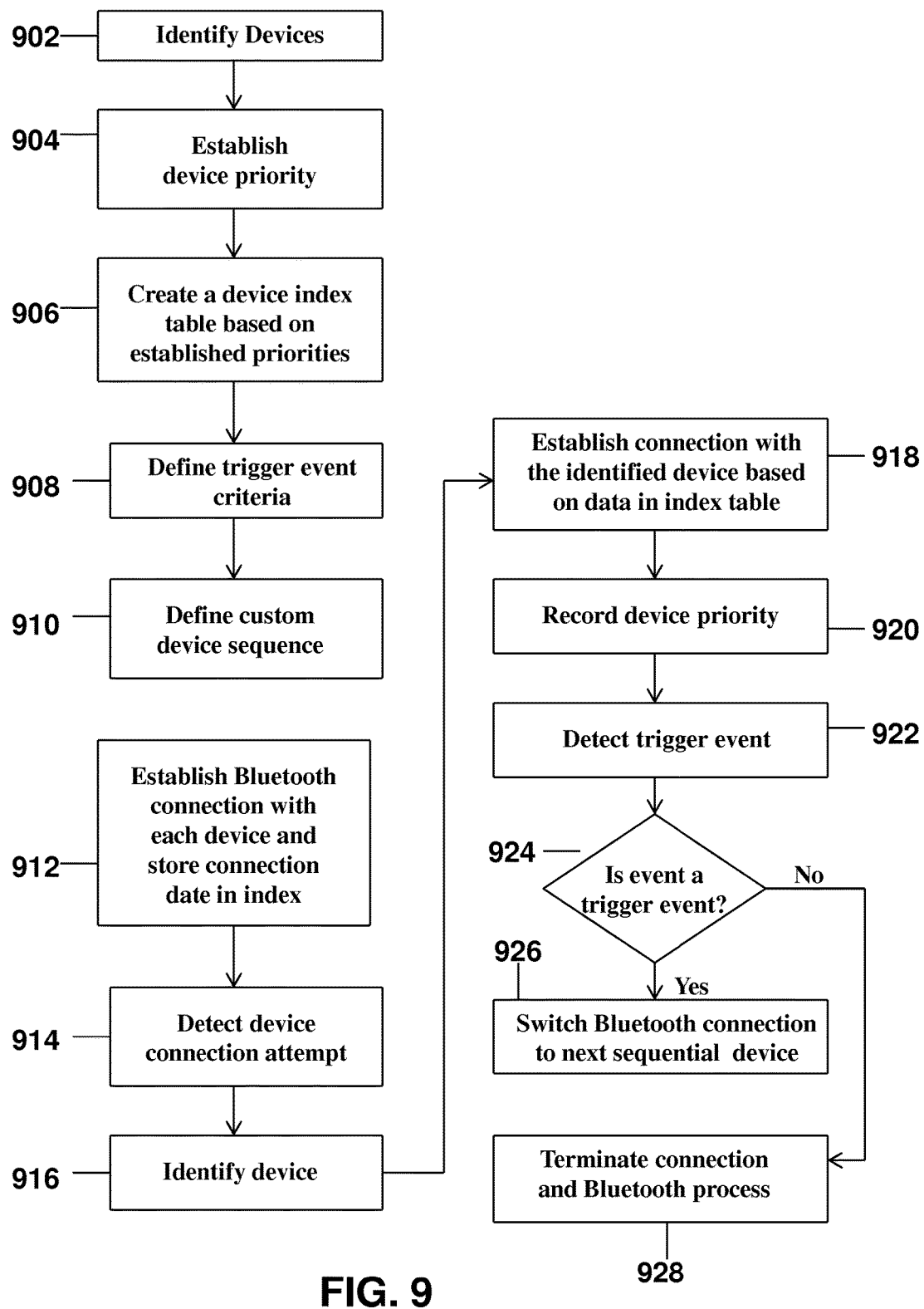
FIG. 9 is a flow diagram of the steps in a method of the present invention in which a custom device connection sequence is implemented.

FIG. 9 is a flow diagram of the steps in a method of the present invention in which a custom device connection sequence is implemented. As with the previously discussed alternate methods of the present invention, this alternate method is based on the primary method described in FIG. 6. In this method, steps 902, 904, 906, 908 are the same as corresponding steps in FIG. 6. Step 10 of this method will define the custom device sequence. In the remainder steps 912, 914, 916, 918, 920, 922, 924, 926 and 928 of this method can be the same as the corresponding steps in FIG. 8. In the alternate method, the steps after step 910 can be similar to the method described in FIG. 6.

It is important to note that while the present invention has been described in the context of a fully functioning computer device security system. Those skilled in the art will appreciate that the processes of the present invention are capable of being distributed in the form of instructions in a computer readable storage medium and a variety of other forms, regardless of the particular type of medium used to carry out the distribution.

We claim:

1. A system for automatically switching a connection between a network receiver device and one of a multiple of network transmitter devices in a Bluetooth technology network environment using predetermined events to trigger the connection switch comprising:
a network receiver device for interacting with a user, said receiver device implementing Bluetooth technology for establishing a connection with network devices and for automatically switching connections between network transmitter devices;
multiple network transmitter devices for connecting to and transmitting data to said network receiver device using Bluetooth technology;
an index for storing information of said multiple network transmitter devices, wherein said index for storing information of said multiple network transmitter devices further comprises a record for each of the multiple network transmitter devices, each record containing:
a device identification field having an identifier for the corresponding network transmitter device;
a device priority field that includes the corresponding priority assignment of the network transmitter device; and
a connection protocol field having a connection protocol code which identifies steps and information for establishing a connection between the network receiver device and the corresponding network transmitter device;
a timer module for defining a timer trigger sequence of the multiple network transmitter devices based on their corresponding priority assignments and setting a timer to a timed period in response to establishing a connection between the network receiver device and a first one of the multiple network transmitter devices; and
a switching module in the Bluetooth technology network containing network event trigger criteria for automatically switching, in response to detecting that the timed period has completed, a connection of said network receiver device from the first network transmitter device to a second one of the multiple network transmitter devices, wherein the second network transmitter device is selected based on the timer trigger sequence.

2. The system for automatically switching a connection between a network receiver device and one of a multiple of network transmitter devices in a Bluetooth technology network environment as described in claim 1 wherein trigger criteria further comprises triggering events at predetermined time periods.

3. The system for automatically switching a connection between a network receiver device and one of a multiple of network transmitter devices in a Bluetooth technology network environment as described in claim 1 wherein trigger criteria further comprises triggering events at a detection and identification of pre-identified system activities.

4. A method for automatically switching a connection between a network receiver device and one of a multiple of network transmitter devices in a Bluetooth technology network environment using predetermined events to trigger the connection switch comprising:
identifying multiple network transmitter devices for connecting to and transmitting data to a network receiver device using Bluetooth technology;
establishing a priority of the identified multiple network transmitter devices;
creating a record for each of the multiple network transmitter devices, resulting in a set of records, wherein each of the set of records comprises:
a device identification field having an identifier for the corresponding network transmitter device;
a device priority field that includes the established priority of the corresponding network transmitter device; and
a connection protocol field having a connection protocol code which identifies steps and information for establishing a connection between the network receiver device and the corresponding network transmitter device;
defining a timer trigger sequence of the multiple network transmitter devices based on the established priorities of the multiple network transmitter devices stored in the set of records;
establishing a connection between the network receiver device and a first one of the multiple network transmitter devices;
setting a timer to a timed period in response to establishing the connection between the network receiver device and the first network transmitter device;
detecting that the timed period has completed; and
automatically switching the connection from the first network transmitter device to a second one of the multiple network transmitter devices, wherein the second network transmitter device is selected based on the timer trigger sequence.

5. The method as described in claim 4 further comprising:
initiating a discovery mode status for the network receiver device;
detecting activity at the first network transmitter device;
establishing a connecting between the network receiver device and the first network transmitter device where the detected activity occurred; and
recording the device priority for the first network transmitter device.

6. The method as described in claim 5 wherein said established connection between the network receiver device and the first network transmitter device further comprises using a previously established network connection protocol for the first network transmitter device to establish the connection.

7. The method as described in claim 4 wherein defining one or more trigger events further comprises defining a termination of a specific activity at a network transmitter device as a trigger event.

8. The method as described in claim 4 further comprising after detecting an event trigger, identifying the detected event trigger and determining whether the detected event trigger is a defined trigger event.

9. The method as described in claim 8 further comprising initiating a connection termination when the determination is that the detected event trigger is not a defined trigger event.

10. The method as described in claim 9 further comprising initiating a termination of the automatic switching of the connection to the second network transmitter with the highest assigned priority, when the determination is that the detected event trigger is not a defined trigger event.

11. A method for automatically switching a connection between a network receiver device and one of a multiple of network transmitter devices in a Bluetooth technology network environment using predetermined events to trigger the connection switch comprising:

identifying multiple network transmitter devices for connecting to and transmitting data to a network receiver device using Bluetooth technology;
creating a record for each of the multiple network transmitter devices, resulting in a set of records, wherein each of the set of records comprises:
  a device identification field having an identifier for the corresponding network transmitter device;
  a device priority field that includes a priority of the corresponding network transmitter device; and
  a connection protocol field having a connection protocol code which identifies steps and information for establishing a connection between the network receiver device and the corresponding network transmitter device;
establishing a custom sequence for the identified multiple network transmitter devices based on a user preference;
establishing a connection between the network receiver device and a first one of the multiple network transmitter devices based on the corresponding connection protocol code;
setting a timer to a timed period in response to establishing the connection between the network receiver device and the first network transmitter device;
detecting that the timed period has completed; and
automatically switching the connection from the first network transmitter device to a second one of the multiple network transmitter devices, wherein the second network transmitter device is selected based on the custom sequence.

* * * * *